United States Patent [19]
Banham et al.

[11] Patent Number: 5,764,921
[45] Date of Patent: Jun. 9, 1998

[54] METHOD, DEVICE AND MICROPROCESSOR FOR SELECTIVELY COMPRESSING VIDEO FRAMES OF A MOTION COMPENSATED PREDICTION-BASED VIDEO CODEC

[75] Inventors: Mark R. Banham, Arlington Heights; James C. Brailean, Park Ridge; Stephen N. Levine, Itasca; Aggelos K. Katsaggelos, Chicago; Guido M. Schuster, Evanston, all of Ill.

[73] Assignees: Motorola, Schaumburg; Northwestern University, Evanston, both of Ill.

[21] Appl. No.: 548,776

[22] Filed: Oct. 26, 1995

[51] Int. Cl.$^6$ ............................................. H04N 1/417
[52] U.S. Cl. ............................. 395/200.77; 348/415
[58] Field of Search ..................... 364/514 R, 715.02; 348/413, 402, 415, 416, 407; 395/114, 200.77

[56] References Cited

U.S. PATENT DOCUMENTS

| | | | |
|---|---|---|---|
| 5,454,079 | 9/1995 | Roper et al. | 395/200.13 |
| 5,463,565 | 10/1995 | Cookson et al. | 364/514 R |
| 5,483,286 | 1/1996 | Kim | 348/402 |
| 5,535,311 | 7/1996 | Zimmerman | 395/114 |
| 5,576,767 | 11/1996 | Lee et al. | 348/413 |

OTHER PUBLICATIONS

R. Neff, A. Zakhor and M. Vetterli, "Very Low Biot Rate Video Coding Using Matching Pursuits". Proc. SPIE Visual Communications and Image Processing, vol. 2308, Chicago, pp. 47–60, Sep. 1994.

R. Neff, A. Zakhor and M. Yetterli, "Matching Pursuit Video Coding at Very Low Bit Rates", Proc. IEEE Data Compression Conference, Snowbird, Utah, Mar. 1995.

S. Mallat and Z. Zhang, "Matching Pursuits with time–Frequency Dictionaries", IEEE Trans, Signal Proc., vol. 41, pp. 2297–3415, Dec. 1993.

I. H. Witten, R. M. Neal and J. G. Cleary, "Arithmetic Coding for Data Compresson", Communications of the ACM, vol. 31, No. 6, pp. 520–540, Jun. 1987.

Draft Recommendation H.263, ITU–T, "Video Coding for Low Bit Rate Communication", Jun. 29, 1995.

Peter Gerken, "Object–Based Analysis–Synthesis Coding of Image Sequences at Very Low Bit Rates", IEEE Transactions on Circuits and Systems for Video Technology, vol. 4, No. 3, Jun. 1994.

Mark R. Banham, James C. Brailean, Cheuk L. Chan, Aggelos K. Katsaggelos, "Low bit Rate Video Coding Using Robust Motion Vector Regeneration in the Decoder" IEEE Transactions on Image Processing, vol. 3, No. 5 Sep. 1994.

*Primary Examiner*—Emanuel T. Voeltz
*Assistant Examiner*—Thomas Peeso
*Attorney, Agent, or Firm*—Darleen J. Stockley

[57] ABSTRACT

A method (100, 200), device (300) and microprocessor (400) are provided for selectively compressing video frames of a motion compensated prediction-based video codec based on a predetermined set of compression techniques. An energy estimate of the current displaced frame difference, DFD, is used to compute a ratio between the estimate and a historical mean of energy estimates. The ratio is iteratively compared to a predetermined set of thresholds which are associated with the predetermined set of compression techniques. The comparisons are used to choose a technique based on the thresholds, and a technique is selected to be used for encoding the current DFD.

21 Claims, 3 Drawing Sheets

200

METHOD, DEVICE AND MICROPROCESSOR FOR SELECTIVELY COMPRESSING VIDEO FRAMES OF A MOTION COMPENSATED PREDICTION-BASED VIDEO CODEC

FIELD OF THE INVENTION

The present invention relates generally to video codecs, and more particularly to coding efficiency in video codecs.

BACKGROUND OF THE INVENTION

The field of digital video compression has been dominated by techniques which use motion compensated prediction-based approaches to the problem of compression. Evidence of such domination is seen in the ISO MPEG 1 and 2 standards, the ITU H.261 standard, and the currently emerging ITU H.263 standard. Each of these video compression standards uses block-based motion estimation between video frames, followed by prediction of a frame, or motion compensation, in order to reduce the amount of redundant information before coding. Such an approach leads to a reduction in the bits which are required to effectively code the video information.

An important problem in the context of motion compensated video coding is the need to efficiently encode the motion information and the errors in the motion-based prediction. The prediction error between two frames of motion compensated video is referred to as the "Displaced Frame Difference", or DFD. The DFD is generally a nonstationary, high-pass image which consists of error around the edges of moving objects where a motion estimation technique has failed to adequately represent the motion in the video scene. Often, the DFD will also contain regions of large, homogeneous error information. This happens when new objects enter the scene, or when objects are displaced by a large amount of motion between video frames.

Different compression techniques provide different levels of efficiency when applied to the problem of encoding the DFD. The classical approach used to encode the DFD information is the use of a block-wise Discrete Cosine Transform (DCT), followed by entropy encoding of the coefficients of the transform. This approach works well when the pixels within each block are well modeled by a first order Markov process. The DCT is close to the optimal transform (the Karhunen-Loeve Transform) in terms of energy compaction capabilities when this first order Markov model is met. However, when this model breaks down, the DCT can become less efficient than some alternative techniques at coding the DFD image. Some of the other approaches that have been successfully applied to encoding the DFD include: vector quantization, wavelets or subband coding, and non-orthogonal Gabor function expansions. Each of these approaches has different coding properties from the DCT, and can be more efficient at coding the DFD under various circumstances. For example, when the DFD has no large homogeneous regions of information, but does consist of perceptually important error information around the edges of significant objects, the Gabor expansion approach can out-perform the DCT in terms of coding efficiency.

Characterizing the nature of the DFD in terms of the energy content of the signal in a meaningful way is thus a very important problem. Having such a characterization can lead to more efficient use of the various types of coding tools which already exist. In the context of the Rate Control problem, the allocation of bits across a video sequence with a target output bitrate, such a characterization may provide additional useful information for making the allocation of available bits perceptually meaningful. Prior work associated with existing rate control systems has centered largely on allocating bits at a block level to achieve an overall bitrate. Consideration of the global properties of the DFD, however, is not a technique which has been used for selecting from alternative frame-level compression techniques to achieve an overall target bitrate.

Thus, there is a need for a method, device and microprocessor for efficient use of multiple coding techniques to compress video sequences having variations in the amount and type of motion between frames in the scene.

DETAILED DESCRIPTION OF A PREFERRED EMBODIMENT

A video sequence consists of individual images, or frames, of video data which are two dimensional representations of a three dimensional scene. A frame of video at time instant k is represented by the two dimensional signal, $f_k(i,j)$. These frames appear at regularly spaced intervals in time. The displaced frame difference, or DFD, is obtained by taking the difference in intensity values at each pixel in a frame between the current frame, $f_k(i,j)$, and a motion compensated version of the previous frame, $f_{k-1}(i-dx(i,j), j-dy(i,j))$, where $dx(i,j)$ and $dy(i,j)$ are the estimated displacements in the x and y directions at pixel $(i,j)$, obtained from a predetermined motion estimation technique. The DFD, which is a prediction error image, may be encoded using a variety of compression techniques, as mentioned above.

The present invention provides a method which selects an appropriate coding technique from a predetermined set of candidates for each incoming DFD frame of a video sequence in the encoder. This method leads to the efficient use of the multiple coding techniques to compress video sequences having variations in the amount and type of motion between frames in the scene.

Figure 1:
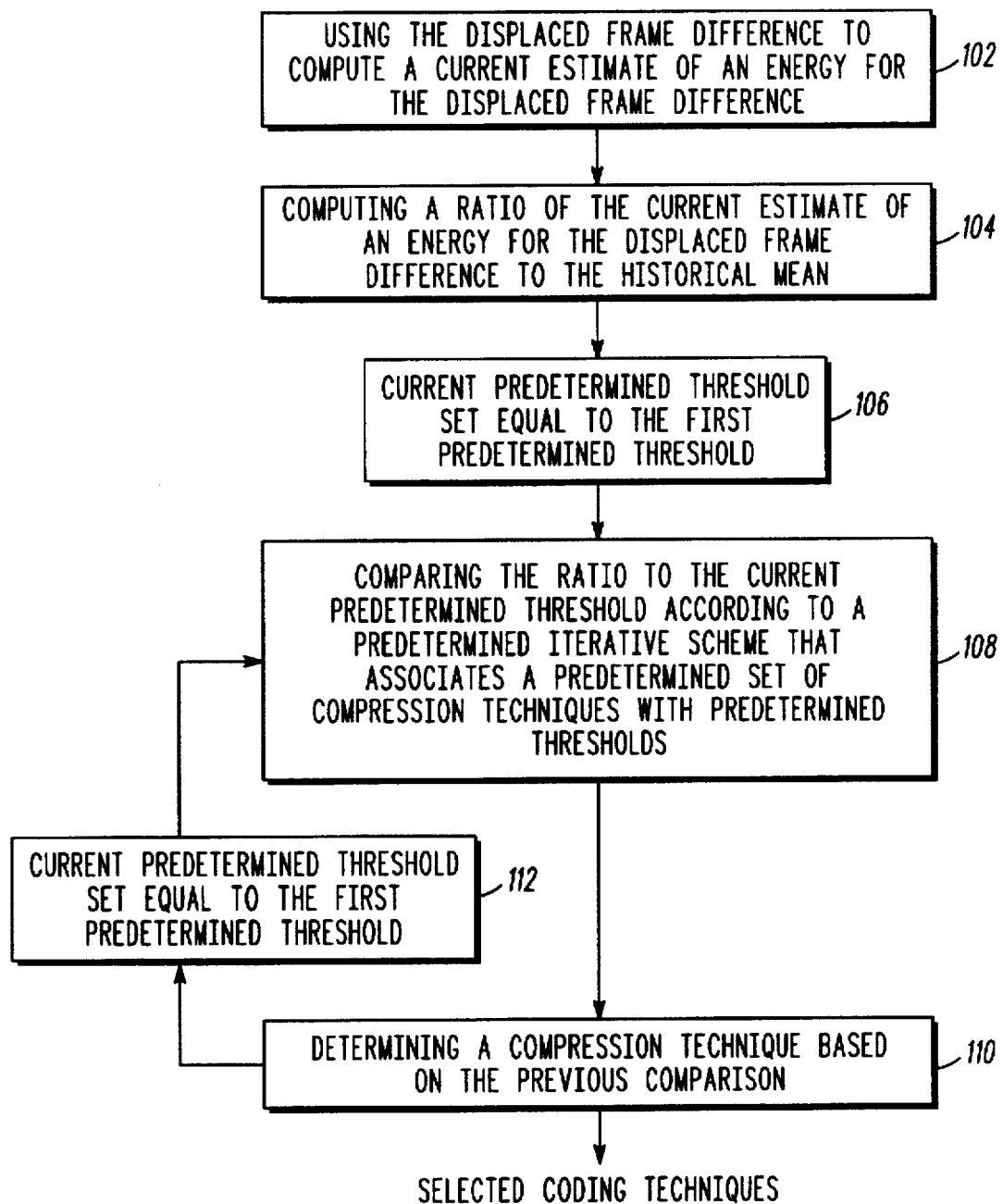
FIG. 1 is a flow chart of a preferred embodiment of steps of a method in accordance with the present invention.

FIG. 1, numeral 100, is a flow diagram of a preferred embodiment of a method for selectively compressing video frames of a motion compensated prediction-based video codec in accordance with the present invention. The first step consists of using the current displaced frame difference, DFD, to compute a current estimate of an energy for the DFD (102). The next step consists of computing a ratio of this energy estimate to a historical mean of energy estimates of previous DFDs (104). The current predetermined threshold is then specified as the first predetermined threshold from a list of thresholds (106). The ratio is then compared to a predetermined threshold according to a predetermined iterative scheme (108). The predetermined iterative scheme consists of repeating a comparison of the ratio to the next current predetermined threshold which is related to a predetermined DFD coding technique. If the ratio exceeds the current predetermined threshold, the corresponding technique is chosen for encoding the current DFD (110). Otherwise, the ratio is compared to the next predetermined threshold (112) which is associated with another coding technique. The process is repeated until the set of potential coding techniques is exhausted.

Figure 2:
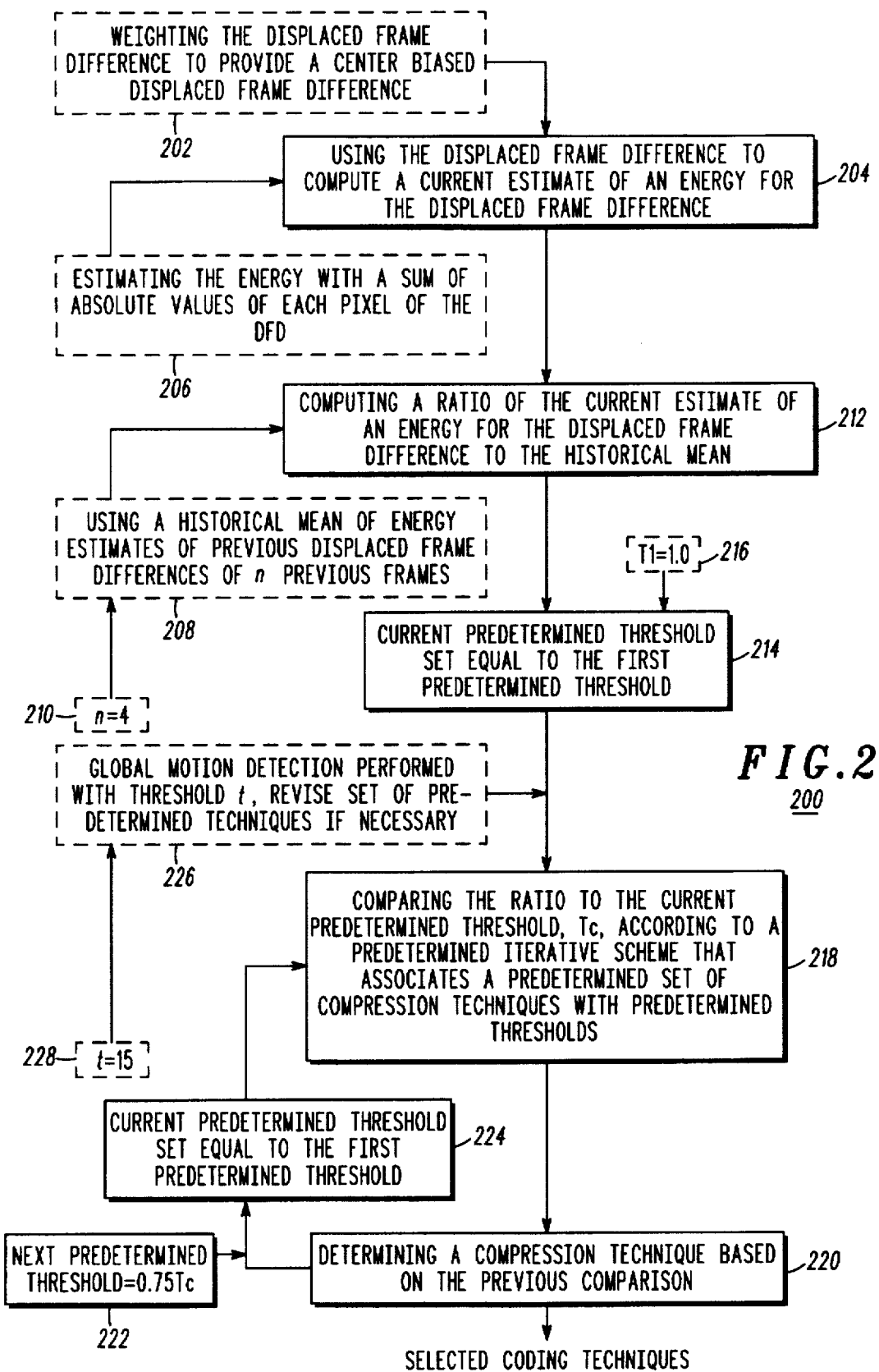
FIG. 2 is a flow chart of another preferred embodiment of steps of a method in accordance with the present invention.

FIG. 2, numeral 200, is a flow diagram of another preferred embodiment of a method for selectively compressing video frames of a motion compensated prediction-based video codec in accordance with the present invention. The first step consists of weighting the current displaced frame difference to provide a center biased DFD (202). The weighted DFD is the original DFD at a given frame multiplied by a piecewise pyramidal window. This window value is changed depending on the 16×16 macroblock in which the pixels of the DFD reside. The weighted DFD for all channels is given by, $$\overline{DFD}_k(i,j) = \left[1 - \left|\frac{\left\lfloor\frac{i}{16}\right\rfloor - 4}{7}\right|\right]\left[1 - \left|\frac{\left\lfloor\frac{j}{16}\right\rfloor - 5}{8}\right|\right] DFD_k(i,j).$$

Here, DFDk(i,j) refers to the three channel image of the displaced frame difference at Frame k, and the symbol $\lfloor \rfloor$ indicates integer truncation. The constants appearing in the weighting function are given here for QCIF resolution video images, which have a support of 176×144 in the Y channel, and 88×72 in the Cr and Cb channels. These constants may be changed to accommodate any image format by appropriate scaling. In the QCIF resolution, a 16×16 macroblock contains 16×16 pixels from the Y channel, and 8×8 pixels from each of the chrominance channels. As a result, the function above describes a window which maps one-to-one onto the pixels of the Y channel. The chrominance pixels in each macroblock are weighted by the same value as the corresponding pixels from the Y channel in that macroblock. The emphasis in this weighting is placed on macroblocks towards the center of the image, which is perceptually important.

The next step consists of using the weighted displaced frame difference to compute a current estimate of an energy for the DFD (204). A special, computationally simple estimate is defined here which approximates the average energy in the DFD of a video frame (206). The metric is the sum of absolute values, SOA, of a weighted DFD, measured across the luminance, Y, and chrominance, Cr and Cb, planes of a color video image. The SOA is defined as Sk for Frame k in terms of the individual channels of the DFD: Y, Cr,Cb, $$S_k = \sum_{i=0}^{N-1}\sum_{j=0}^{M-1} |\overline{DFD}^Y_{k(i,j)}| + \sum_{i=0}^{(N/2)-1}\sum_{j=0}^{(M/2)-1} |\overline{DFD}^{Cr}_{k(i,j)}| + \sum_{i=0}^{(N/2)-1}\sum_{j=0}^{(M/2)-1} |\overline{DFD}^{Cb}_{k(i,j)}|,$$

with N=144, and M=176 for the QCIF resolution.

The next step consists of computing a historical mean of energy estimates of previous DFDs (208). The historical mean is obtained by averaging the past n Sk's. The historical mean is defined as $$\overline{S}_k = \frac{\sum_{i=0}^{n-1} S_{k-i}}{n}$$

which as a moving average of the energy changes in the DFDs from frame to frame. The value of n is set to four (210). The history of these changes is tracked over four frames because of the temporal correlation that generally exists over this small range in time. This common trend mean tends to smooth out large variations in the prediction error energy measure.

In the next step, the current Sk is divided by the current Sk to form an energy ratio (212). The current predetermined threshold is then set equal to the first predetermined threshold, T1 (214). The ratio is then compared to the current predetermined threshold, Tc, according to an iterative scheme (218). The iterative comparison involves repeating a series of steps which test the ratio against predetermined thresholds related to predetermined DFD coding techniques. The iterative comparison consists of:

A) where the ratio is greater than the predetermined threshold, selecting a first compression technique (220);

B) where the ratio is less than or equal to the predetermined threshold, compare the ratio to a next predetermined threshold (224);

C) where the ratio is greater than the next predetermined threshold, selecting a next compression technique (220);

D) where the ratio is less than or equal to the next predetermined threshold, repeating steps C and D using successive predetermined thresholds and compression techniques from a predetermined list until the list of the predetermined compression techniques has been exhausted.

The predetermined thresholds used are obtained by successively reducing the magnitude of an initial predetermined threshold, T1 (214). The initial value of T is set to 1.00 (216). Each time the ratio is less than the predetermined threshold, the next threshold is computed by reducing T by a factor of 0.75 (222). For example, given a set of three candidate DFD coding techniques whose properties are such that each successive technique is more efficient at coding smaller and more localized prediction error energy than the previous technique, the two predetermined thresholds would be T1=1.00, T2=0.75. An example of the three DFD encoding techniques would be standard block-based DCT coding, Gabor function expansion and coding, and coding the DFD as entirely zero energy, or no coding, respectively.

These threshold comparison tests must be based on a subjective understanding of the importance of the prediction error relative to the overall quality of the scene. Thus, the thresholds may be controlled through an external rate control mechanism, which determines the trade-offs between coding techniques based on their relative rate-distortion characteristics at the individual video frame level.

At the beginning of the iterative comparison, a predetermined global motion detection technique is performed (226), and where global motion is detected, a predetermined subset of the predetermined list of compression techniques is selected for use in the iteration. Global motion is detected by determining the number of unrestricted motion vectors pointing outside a video frame in accordance with ITU Draft International Standard H.263, Annex D. Standard macroblock-based motion vectors are obtained by searching for a match over only those blocks which lie within the boundaries of the previous frame. Unrestricted motion vectors are allowed to point outside the boundaries of the previous frame. The matching blocks for those macroblocks are obtained by repeating the border pixels of the previous frame. When there is global motion (especially in the case of camera panning) the vectors pointing outside the borders often provide the best match (in terms of the absolute error measure used to determine a match). When there is no global motion, however, the extended search vectors usually match the standard search vectors, and few are chosen pointing outside the borders.

The global motion detection counts the number of vectors which are chosen pointing outside the borders of the previous frame, and compares that number to a predetermined threshold, t. When this number exceeds the predetermined threshold, the frame is said to be a global motion frame. The predetermined threshold, t is set to 15 for QCIF resolution video (228). The detection of global motion causes a reduction in the set of predetermined compression techniques. Those techniques which do not completely update all spatial positions in the image are removed from the set. For example, if three predetermined candidate techniques were DCT, a Gabor based non-orthogonal expansion, and no coding, only the DCT technique would be kept in the set of predetermined techniques. This would result in only one available coding choice in the presence of global motion, for this example.

Figure 3:
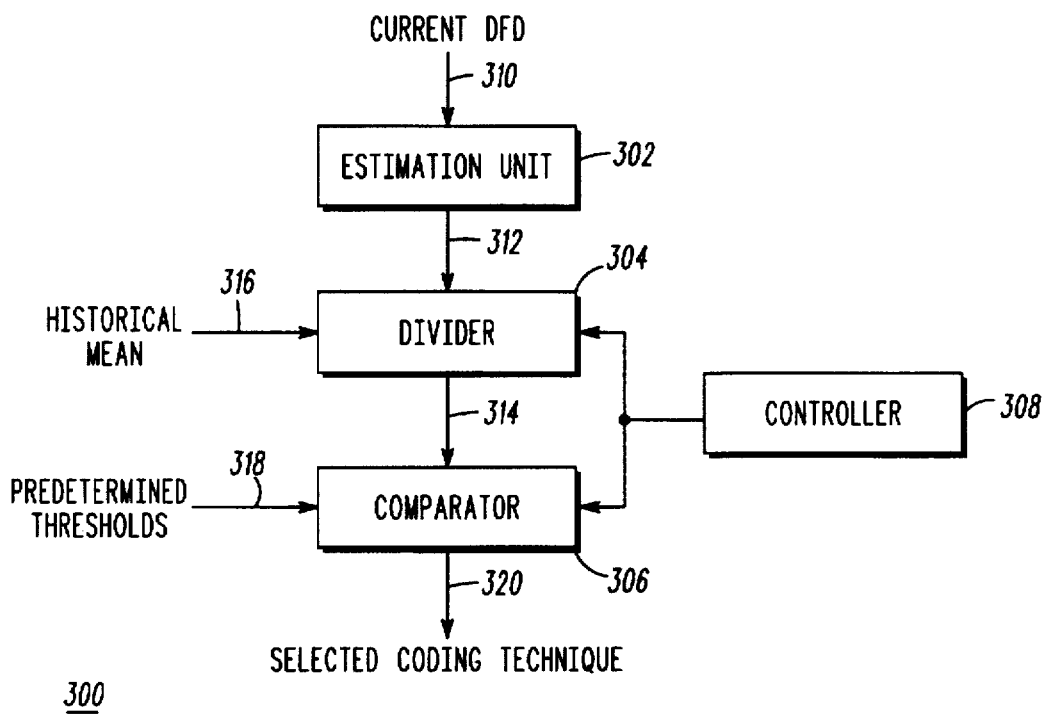
FIG. 3 is a block diagram of one preferred embodiment of a device in accordance with the present invention.

FIG. 3, numeral 300, is a block diagram of one preferred embodiment of a device for selectively compressing video frames of a motion compensated prediction-based video codec in accordance with the present invention. The device comprises an estimation unit (302), a divider (304), a comparator (306), and a controller (308). The estimation unit (302) uses the current displaced frame difference (310) to compute a current estimate of an energy for the displaced frame difference as described in the preferred embodiment of the method described above (200). The divider (304) is coupled to the estimation unit (302), and is used for computing a ratio of the current estimate of an energy for the displaced frame difference (312) to the historical mean (316) as described in the preferred embodiment of the method described above (200). The comparator (306) is coupled to the divider (304), and is used for determining a compression technique by comparing the ratio (314) to a predetermined threshold (318) according to a predetermined iterative scheme that associates a predetermined list of candidate compression techniques with predetermined thresholds as described in the preferred embodiment of the method described above (200). The controller (308) is coupled to the comparator and the divider, and is used for implementing the iterative comparison scheme described in the preferred embodiment of the method above (200). The device outputs a selected DFD coding technique (320).

Figure 4:
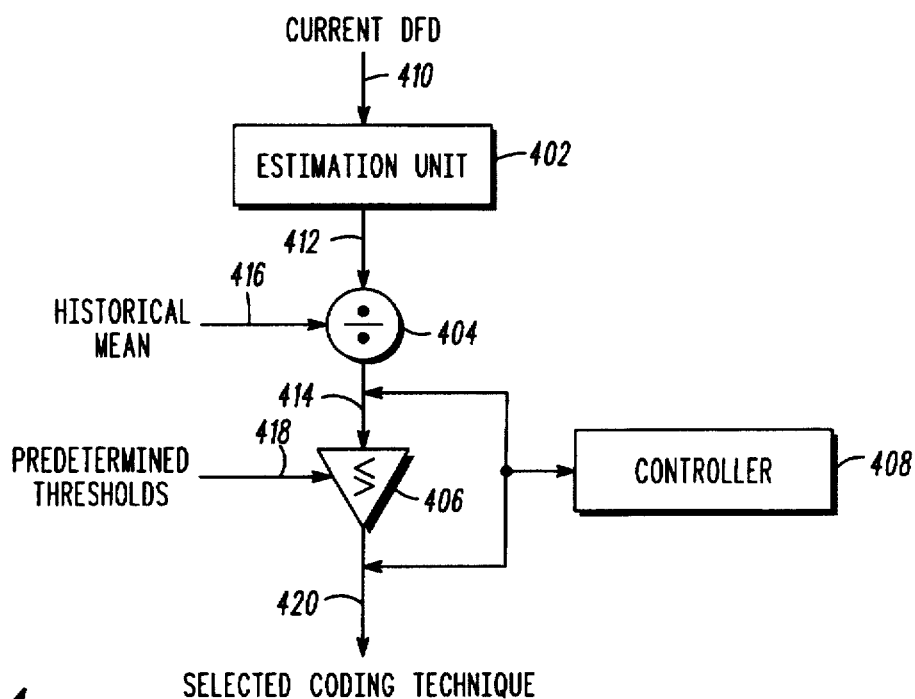
FIG. 4 is a schematic of one preferred embodiment of a microprocessor in accordance with the present invention.

FIG. 4, numeral 400, is a schematic of one preferred embodiment of a microprocessor in accordance with the present invention. The microprocessor comprises an estimation unit (402), a divider (404), a comparator (406), and a controller (408). The estimation unit (402) uses the current DFD (410) to compute a current estimate of an energy for the DFD as described in the preferred embodiment of the method described above (200). The divider (404) is coupled to the estimation unit (402), and is used for computing a ratio of the current estimate of an energy for the DFD (412) to the historical mean (416) as described in the preferred embodiment of the method described above (200). The comparator (406) is coupled to the divider (404), and is used for determining a compression technique by comparing the ratio (414) to a predetermined threshold (418) according to a predetermined iterative scheme that associates a predetermined list of candidate compression techniques with predetermined thresholds as described in the preferred embodiment of the method described above (200). The controller (408) is coupled to the comparator and the divider, and is used for implementing the iterative comparison scheme described in the preferred embodiment of the method above (200). The microprocessor outputs a selected DFD coding technique (420).

The method and device may be selected to be embodied in least one of: A) an application specific integrated circuit; B) a field programmable gate array; and C) a microprocessor; and D) a computer-readable memory; arranged and configured for selectively compressing video frames of a motion compensated prediction-based video codec based on predetermined estimated motion between two video frames, a displaced frame difference between the two video frames, and a historical mean of energy estimates of previous displaced frame differences in accordance with the scheme described in greater detail above.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for selectively compressing video frames of a motion compensated prediction-based video codec based on predetermined estimated motion between two video frames, a displaced frame difference between the two video frames, and a historical mean of energy estimates of previous displaced frame differences, comprising the steps of:

A) using the displaced frame difference to compute a current estimate of an energy for the displaced frame difference;

B) computing a ratio of the current estimate of an energy for the displaced frame difference to the historical mean; and C) determining a compression technique by comparing the ratio to a predetermined threshold according to a predetermined iterative scheme that associates a predetermined list of compression techniques with predetermined thresholds that are stored in memory, further including, at a beginning of step C, performing a predetermined global motion detection technique, and where global motion is detected, selecting a predetermined subset of the predetermined list of compression techniques for use in step C.

2. The method of claim 1 wherein the displaced frame difference is weighted to provide a center-biased displaced frame difference.

3. The method of claim 1 wherein the estimate of the energy for the displaced frame difference is a sum of an absolute value of each pixel of the displaced frame difference.

4. The method of claim 1 wherein the historical mean of energy estimates of previous displaced frame differences is an average of n, n a positive integer, previous estimates of the energy of displaced frame differences.

5. The method of claim 4 where n equals 4.

6. The method of claim 1 wherein the predetermined iterative scheme includes:

A) where the ratio is greater than the predetermined threshold, selecting a first compression technique;

B) where the ratio is less than or equal to the predetermined threshold, comparing the ratio to a next predetermined threshold;

C) where the ratio is greater than the next predetermined threshold, selecting a next compression technique;

D) where the ratio is less than or equal to the next predetermined threshold, repeating steps C and D using successive predetermined thresholds and compression techniques from a predetermined list until the list of the predetermined compression techniques has been exhausted.

7. The method of claim 1 wherein global motion includes determining a number of unrestricted motion vectors pointing outside a video frame in accordance with H.263 Annex D and where the number of unrestricted motion vectors pointing outside a video frame is greater than a predetermined value, global motion is detected.

8. The method of claim 1 wherein the method is a process whose steps are embodied in least one of:

A) an application specific integrated circuit;
B) a field programmable gate array; and
C) a microprocessor; and
D) a computer-readable memory;

arranged and configured for selectively compressing video frames of a motion compensated prediction-based video codec based on predetermined estimated motion between two video frames, a displaced frame difference between the two video frames, and a historical mean of energy estimates of previous displaced frame differences in accordance with the scheme of claim 1.

9. A device for selectively compressing video frames of a motion compensated prediction-based video codec based on predetermined estimated motion between two video frames, a displaced frame difference between the two video frames, and a historical mean of energy estimates of previous displaced frame differences, comprising:

A) an estimation unit, for using the displaced frame difference to compute a current estimate of an energy for the displaced frame difference;

B) a divider, coupled to the estimation unit and to receive a historical mean, for computing a ratio of the current estimate of an energy for the displaced frame difference to the historical mean; and C) a comparator, coupled to the divider and to receive predetermined thresholds, for determining a compression technique by comparing the ratio to one predetermined threshold according to a predetermined iterative scheme that associates a predetermined list of candidate compression techniques with predetermined thresholds to provide a selected coding technique; and D) a controller, coupled to the comparator and the divider, for implementing the predetermined iterative scheme, further including, utilizing the comparator for performing a predetermined global motion detection technique, and where global motion is detected, selecting a predetermined subset of the predetermined list of compression techniques.

10. The device of claim 9 wherein the displaced frame difference is weighted to provide a center-biased displaced frame difference.

11. The device of claim 9 wherein the estimate of the energy for the displaced frame difference is a sum of an absolute value of each pixel of the displaced frame difference.

12. The device of claim 9 wherein the historical mean of energy estimates of previous displaced frame differences is an average of n, n a positive integer, previous estimates of the energy of displaced frame differences.

13. The device of claim 12 where n equals 4.

14. The device of claim 9 wherein the predetermined iterative scheme includes:

A) where the ratio is greater than the predetermined threshold, selecting a first compression technique;

B) where the ratio is less than or equal to the predetermined threshold, comparing the ratio to a next predetermined threshold;

C) where the ratio is greater than the next predetermined threshold, selecting a next compression technique;

D) where the ratio is less than or equal to the next predetermined threshold, repeating steps C and D using successive predetermined thresholds and compression techniques from a predetermined list until the list of the predetermined compression techniques has been exhausted.

15. The device of claim 9 wherein the device is embodied in at least one of:

A) an application specific integrated circuit;
B) a field programmable gate array;
C) a microprocessor; and
C) a computer-readable memory;

arranged and configured for selectively compressing video frames of a motion compensated prediction-based video codec based on predetermined estimated motion between two video frames, a displaced frame difference between the two video frames, and a historical mean of energy estimates of previous displaced frame differences in accordance with the scheme of claim 10.

16. A microprocessor for selectively compressing video frames of a motion compensated prediction-based video codec based on predetermined estimated motion between two video frames, a displaced frame difference between the two video frames, and a historical mean of energy estimates of previous displaced frame differences, preprogrammed with a software program implementing the steps of:

A) using the displaced frame difference to compute a current estimate of an energy for the displaced frame difference;

B) computing a ratio of the current estimate of an energy for the displaced frame difference to the historical mean; and C) determining a compression technique by comparing the ratio to a predetermined threshold according to a predetermined iterative scheme that associates a predetermined list of candidate compression techniques with predetermined thresholds, further including, at a beginning of step C, performing a predetermined global motion detection technique, and where global motion is detected, selecting a predetermined subset of the predetermined list of compression techniques for use in step C.

17. The microprocessor of claim 16 wherein the displaced frame difference is weighted to provide a center-biased displaced frame difference.

18. The microprocessor of claim 16 wherein the estimate of the energy for the displaced frame difference is a sum of an absolute value of each pixel of the displaced frame difference.

19. The microprocessor of claim 16 wherein the historical mean of energy estimates of previous displaced frame differences is an average of n, n a positive integer, previous estimates of the energy of displaced frame differences.

20. The microprocessor of claim 16 where n equals 4.

21. The microprocessor of claim 16 wherein the predetermined iterative scheme includes:

A) where the ratio is greater than the predetermined threshold, selecting a first compression technique;

B) where the ratio is less than or equal to the predetermined threshold, comparing the ratio to a next predetermined threshold;

C) where the ratio is greater than the next predetermined threshold, selecting a next compression technique;

D) where the ratio is less than or equal to the next predetermined threshold, repeating steps C and D using successive predetermined thresholds and compression techniques from a predetermined list until the list of the predetermined compression techniques has been exhausted.

* * * * *